United States Patent [19]
Steeves

[11] Patent Number: 5,197,341
[45] Date of Patent: Mar. 30, 1993

[54] PAYLOAD ATTITUDE CONTROL TESTER

[75] Inventor: Russell G. Steeves, Chelmsford, Mass.

[73] Assignee: The United States of America as represented by the Secretary of the Air Force, Washington, D.C.

[21] Appl. No.: 721,855

[22] Filed: Jun. 20, 1991

[51] Int. Cl.[5] .......................................... G01M 19/00
[52] U.S. Cl. ................................. 73/865.3; 248/659; 248/661; 248/663; 248/908; 434/34; 73/866.4
[58] Field of Search ....................... 73/865.3, 866.4; 248/648, 659, 660, 661, 663, 664, 666, 667, 908, 912, 913; 434/34

[56] References Cited

U.S. PATENT DOCUMENTS

| | | | |
|---|---|---|---|
| 3,161,988 | 12/1964 | De Boy et al. | 434/34 |
| 3,281,964 | 11/1966 | Hewes | 434/34 |
| 3,344,673 | 10/1967 | Leming | 73/865.3 |
| 3,449,843 | 6/1969 | Richter et al. | 434/34 |
| 3,516,179 | 6/1970 | Dane | 434/34 |
| 3,583,749 | 6/1971 | Hopkins | 294/74 |
| 3,923,165 | 12/1975 | Burdick | |
| 3,936,682 | 2/1976 | Gates | 310/66 |
| 4,114,765 | 9/1978 | Kojima | |
| 4,146,162 | 3/1979 | Skakunov | 228/6 R |
| 4,148,453 | 4/1979 | Brantly | 248/660 |
| 4,562,430 | 12/1985 | Robinson | 340/870.37 |
| 4,619,142 | 10/1986 | Gisler | 73/462 |
| 4,730,797 | 3/1988 | Minovitch | 244/159 |
| 4,803,413 | 2/1989 | Kendig et al. | 318/648 |
| 5,020,357 | 6/1991 | Kavacorie et al. | 73/1 B |
| 5,022,708 | 6/1991 | Nordella et al. | 248/663 X |
| 5,110,294 | 5/1992 | Brand et al. | 73/865.6 X |

FOREIGN PATENT DOCUMENTS

| | | | |
|---|---|---|---|
| 516930 | 6/1976 | U.S.S.R. | 73/866.4 |
| 555314 | 4/1977 | U.S.S.R. | 73/866.4 |

Primary Examiner—Tom Noland
Attorney, Agent, or Firm—Stanton E. Collier; Donald J. Singer

[57] ABSTRACT

The testing device, also known as a totally integrated payload attitude control tester (T.I.P.A.C.T.), is suspend on a single, high strength, low torsional moment line through the gravity vector axis. Attached directly to this line is a strong back assembly having a fixed lateral width with ends thereon. Attached to the ends of the strong back assembly are thin, high strength straps which are connected to a pair of tensile universal joints which are further connected to, by way of this high strength straps, to a pair of trunnions. The trunnions are connected to the payload support frame which may have a satellite payload therein. The three orthogonal axes of the test device allow rotation to ±45 degrees, ±60 degrees and >360 degrees, simultaneously in roll, yaw, and pitch respectively. The thin fabric strap allows movement with virtually no friction or suspension resistance. The strap's elastic restoring torque being very small is overcome transparently by adjusting the overturning moments in initial balancing. Because straps such as the above can only sustain tensile loads, multiple straps are used in combination angles to sustain the shear load as a result of roll rotation. The yaw axis joint may have instead a thin homogeneous material sheet to carry both shear and tensile loads.

13 Claims, 5 Drawing Sheets

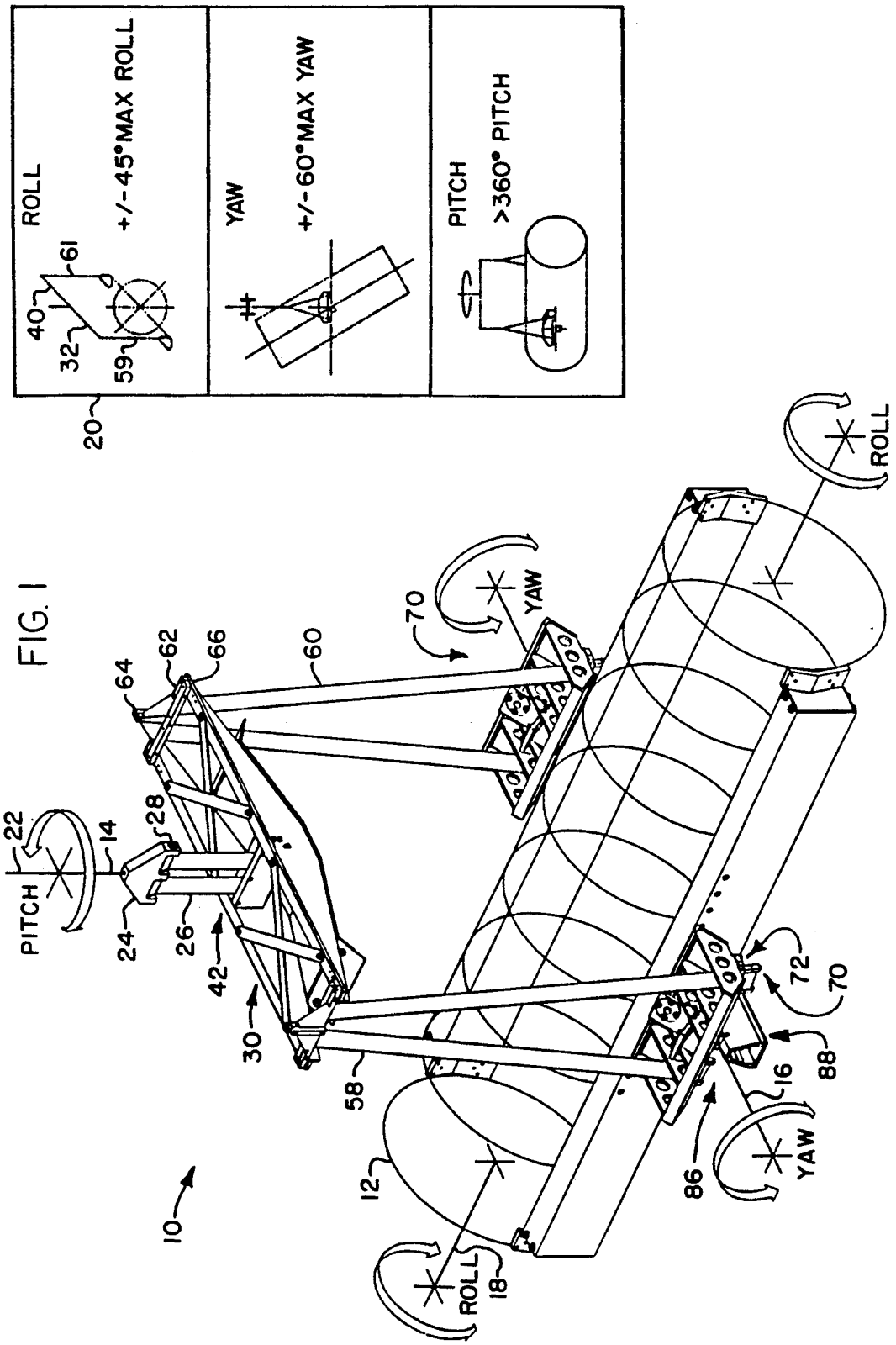

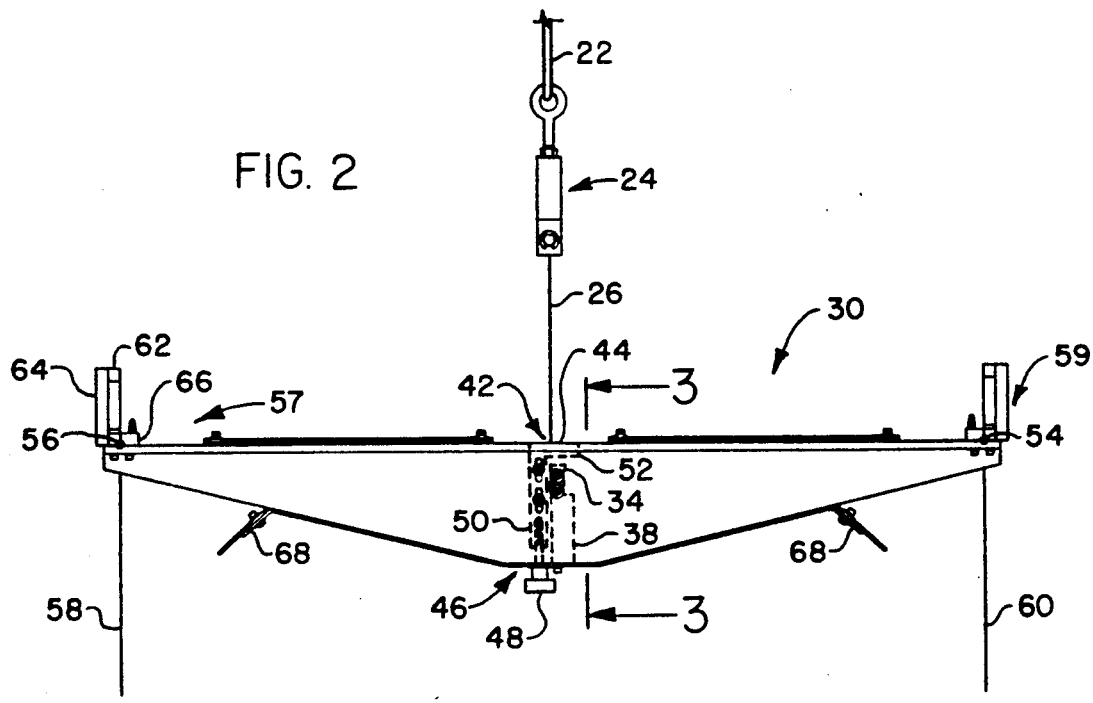
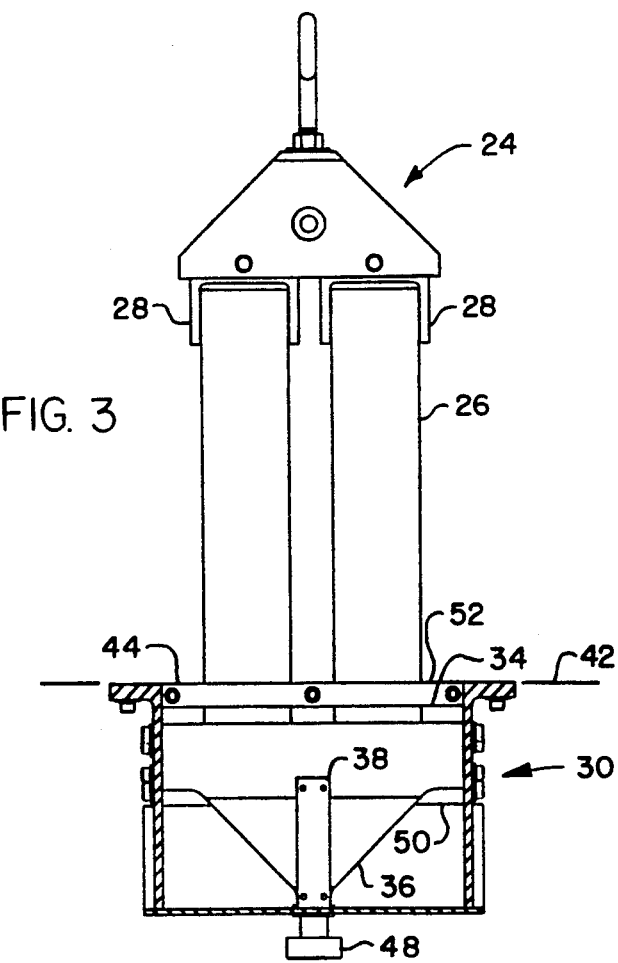

PAYLOAD ATTITUDE CONTROL TESTER

STATEMENT OF GOVERNMENT INTEREST

The invention described herein may be manufactured and used by or for the Government for governmental purposes without the payment of any royalty thereon.

BACKGROUND OF THE INVENTION

The present invention relates to test devices, and, more particularly, to test devices used to test attitude control devices used on spacecraft and satellites, for example.

The ability to test spacecraft attitude control systems is clearly required before actual flight to determine operating characteristics. Because spacecraft operate in a weightless environment, testing on earth presents many difficulties.

Present devices for such testing use air bearings, magnetic suspension, servo driven gimbals, and zero gravity devices.

These devices are typically complex, expensive, non-portable and unable to support a fully integrated spacecraft.

SUMMARY OF THE PRESENT INVENTION

The test device provides a means for characterizing attitude control systems used in spacecraft.

The test device of the present invention, also known as a totally integrated payload attitude control tester (T.I.P.A.C.T.), is suspended on a single, high strength, low torsional moment line through the gravity vector axis. Attached directly to this line is a center roll axis joint being attached to a strong back assembly having a fixed lateral width with ends thereon. Attached to the ends of the strong back assembly are outer roll axis joints having thin, high strength straps which are connected to four lower roll axis joints of the tensile universal joints which are further connected to yaw axis joints, by way of high strength straps, to a pair of trunnions. The trunnions are connected to a payload support frame which may have a satellite payload thereon.

The three orthogonal axes allow rotation to ±45 degrees in roll, ±60 in degrees in yaw and >360 degrees in pitch, simultaneously. Pitch being about the gravity vertical axis; roll being about a longitudinal axis and yaw being about a lateral axis parallel to the strong back assembly. The thin strap allows movement with virtually no friction or suspension resistance. The straps elastic restoring torque being very small is overcome by adjusting the overturning moments. Because fabric straps such as the above can only sustain tensile loads, multiple straps (fibers) are used in combination angles to sustain the shear load as a result of certain rotations. Alternatively a homogeneous material strap such as a polymer film or thin metal sheet may be used to sustain simultaneous tensile and shear loads in the strap.

It is therefore one object of present invention to provide a test device able to characterize attitude control apparatus in a zero-gravity like condition.

Another object of the present invention is a test device able to move in three orthogonal axes with virtually no friction or suspension resistance.

Another object of the present invention is a test device that is highly portable, able to hold substantial weights, and is easily set up in a field environment.

Another object of the present invention is a test device that minimizes the test device mass and moments of inertia to minimize influence on the test payload.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 1 illustrates by perspective view a test device of the present invention having a cylindrical payload thereon.

FIG. 2 is a side view of a strong back assembly of the present invention.

FIG. 3 is a cross section of the strong back assembly showing a center roll axis joint.

DESCRIPTION OF THE PREFERRED EMBODIMENT

Figure 4:
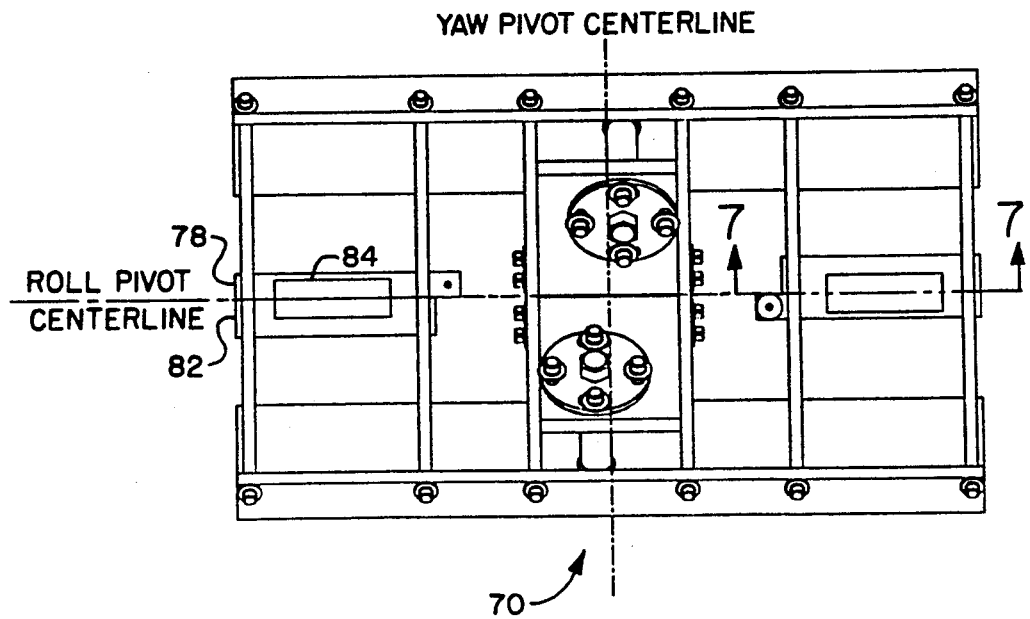
FIG. 4 is a top view of a tensile universal joint of the present invention.

Referring to FIG. 1, a test device 10 is shown having a hypothetical payload 12 thereon. It should be understood that the payload 12 may have thereon attitude control apparatus such as thrusters but the invention is not to be limited to include such items. In relation to the test device 10, three orthogonal axes are defined as follows: a pitch axis 14, a yaw axis 16 and a roll axis 18. The approximate angle limits are noted in the inset 20. All three axes essentially intersect at a common point which further is nearly coincident with the center of gravity of the payload 12 which may be determined by trial and error until the payload 12 is in neutral equilibrium meaning that an angular displacement in any axis does not produce further unassisted motion.

As seen in FIG. 1, the payload 12 is supported by a combination of thin straps having high tensile strength and thus low cross sectional area and area moments of inertia about the axis of flexure.

The axis joint bearing to be detailed hereinafter are flexible, high strength straps made of, for example, Kevlar (TM).

While flexing thin straps in this manner is nearly frictionless, the straps do present an elastic stiffness that the test device 10 effectively negates. Balancing of the payload 12, is done independently in each of the two affected axes, 16 and 18, such that, the overturning moments due to gravity effectively balance the straps' elastic restoring torques. Since straps can only sustain a tensile load, the test device 10 uses straps in combination angles to sustain the shear loads parallel to the yaw axis 16 due to the test body weight and displacement about the roll axis 18. Alternatively a homogeneous material strap such as a polymer film or thin metal sheet may be used to sustain simultaneous tensile and shear loads in the strap.

Pitch rotation about the vertical axis 14 is accomplished by twisting a long, high strength, low torsional moment of inertia line 22 made also of, for example, Kevlar. The line 22 is attached to a main support bracket 24. Attached to the main support bracket 24 is one main support strap 26 being a strap that is wrapped about fixed knurled rods 28 at the ends which provides a self-locking feature. The strap 26 assumes a "U" shape attaching further to a strong back assembly 30 by means of a center roll axis joint 42. The "bearing" in this joint is the bending flexure of the strap 26. The strong back assembly 30 forms the top of a parallelogram 32 of the inset 20.

The connection of the main support strap 26 to the strong back assembly 30 is further detailed in FIGS. 2 and 3.

Referring to FIG. 3, the main support strap 26 wraps about a center strap support 34 having a triangular section 36 about which the main support strap 26 changes direction. A main strap clamp 38 is attached to the center strap support 34 over the strap 26 to secure it thereon.

The parallelogram 32 in the inset 20 has three axes on an upper side 40. A center roll axis 43 occurs along an upper surface 44 of an adjustable assembly 46, FIG. 2. An adjusting screw 48 rotatably held in the strong back assembly 30 is screwed into an strap pivot plate 50 having the upper surface 44 thereon. A inner attachment plate 52 holds the strap 26 to the adjustable strap pivot plate 50. By rotating the adjusting screw 48 which moves adjustable strap pivot plate 50, the center roll axis 43 may be moved vertically for the purpose of obtaining "roll" balance of the complete system. After adjustment, bolts are secured to fix the center roll axis 43.

A pair of outer straps 58 and 60 form the vertical sides 61 and 63 in the parallelogram 32. The strap 58 wraps about an outer strap support 62, like support 34, with a strap clamp plate 64 and an outer attachment plate 66. The strap 60 is similarly treated. The outer roll axis 56 is established where the strap bends being where the strap 58 exits between support 62 and plate 66 in the downward direction. Outer roll axis joints 57 and 59 are thus defined.

The strong back assembly 30 has stop plates 68 to prevent greater than about 45° rotation about the center roll axis 42 when straps 58 or 60 hit the stop plates 68.

Figure 5:
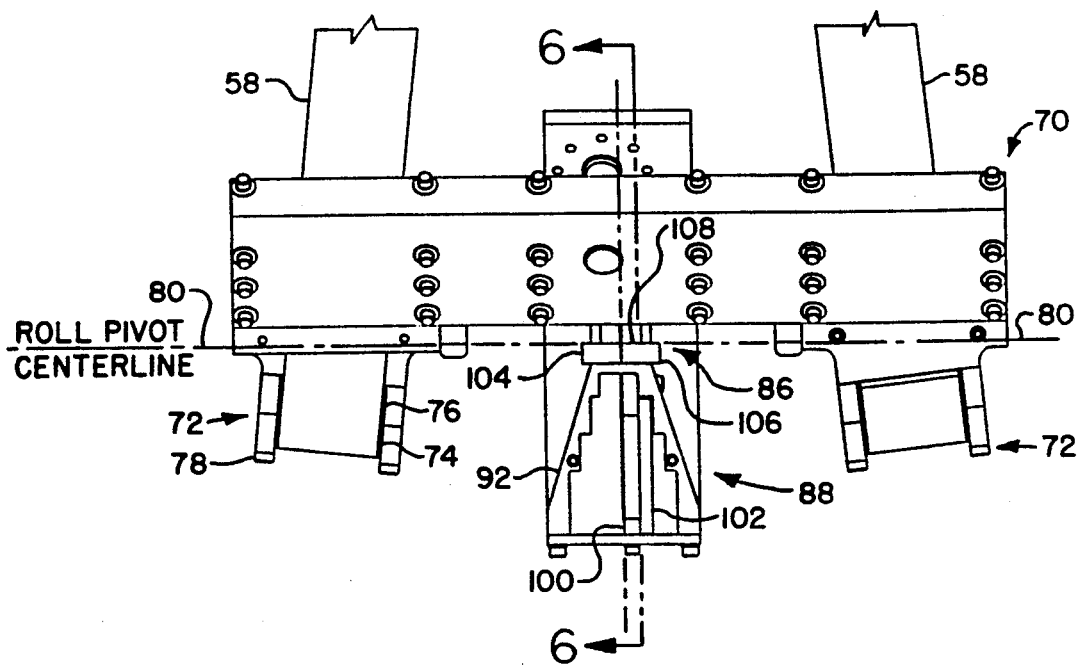
FIG. 5 is an side view of the tensile universal joint of FIG. 4 with a trunnion.

Each vertical outer strap 58 and 60 attach to a tensile universal joint 70 as seen in perspective in FIG. 1, a top view in FIG. 4, a side view in FIG. 5 and other views in FIGS. 6, 7, 8 and 9. The strap 58 forms an inverted "V" with the ends attached to a lower roll axis joint 72 and the tip of the "V" attached to the outer strong back roll axis joint 57, FIG. 2.

Figure 7:
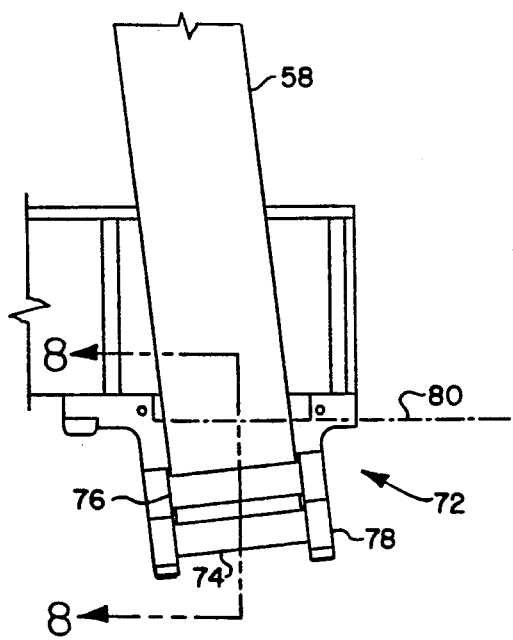
FIG. 7 is a cross section of one lower roll axis joint of FIG. 4.
Figure 8:
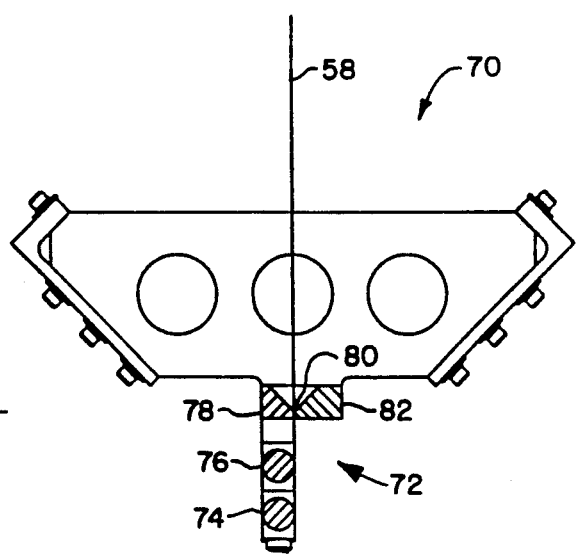
FIG. 8 is a cross section of FIG. 7.
Figure 9:
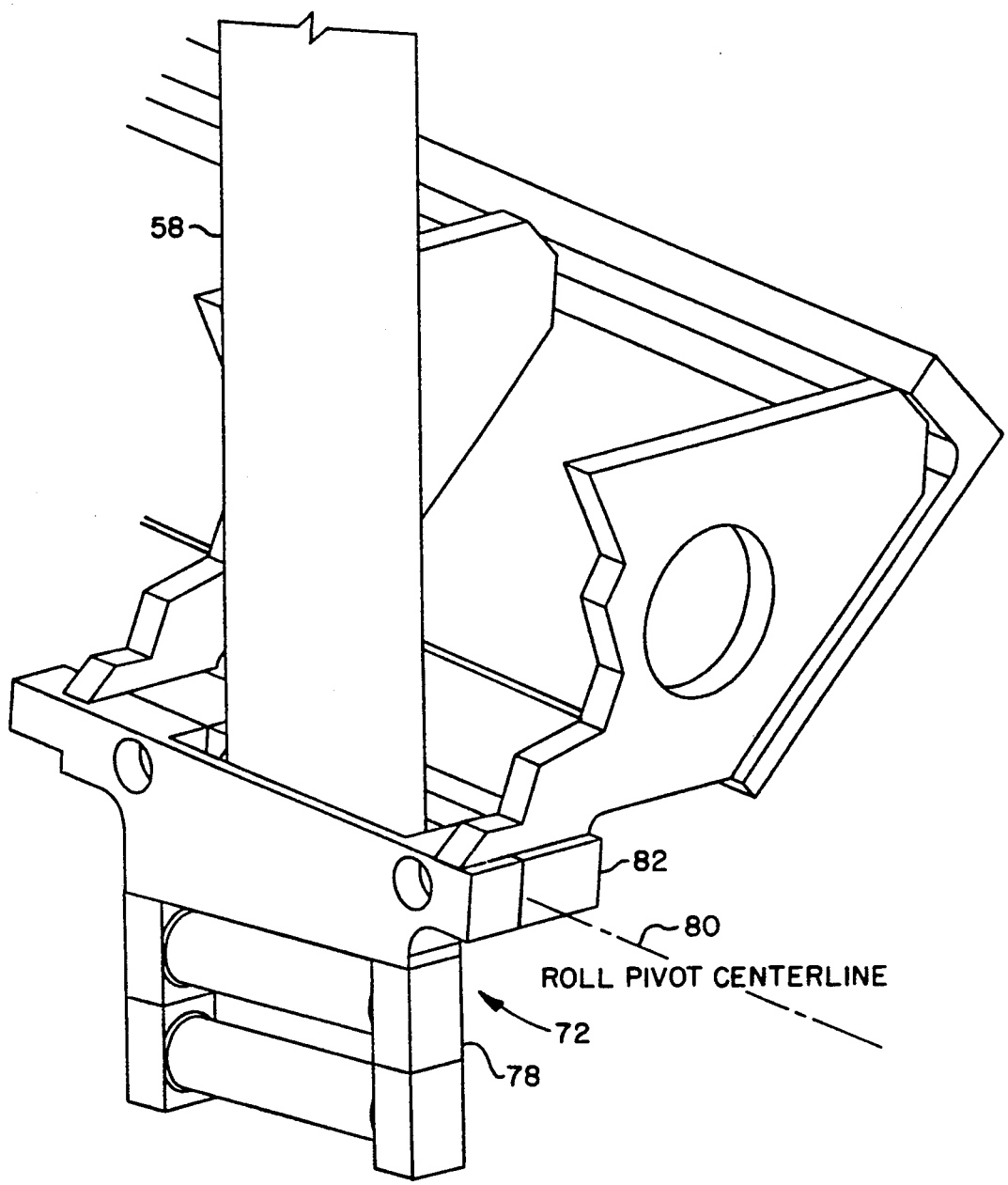
FIG. 9 is a partial cross section perspective view of one lower roll axis joint.

As seen in FIGS. 5, 7, 8 and 9, the strap 58 has two ends which are attached to the lower roll axis joints 72. Two pins 74 and 76 are secured in a slant support 78 and one end of the strap 58 wraps about these for a dog bone attachment 77 as seen in FIG. 7. A slant support clamp 82, FIGS. 4, 7 and 8 attaches to the slant support 78 and a v channel 84 thereon establishes the lower roll axis 80 where it exits slant support 78 and clamp 82 therein. The same applies to the strap 60. Therefore, two lower roll axes 80 are provided. These axes 80 are one of the lower corners of the parallelogram 32 in the inset 20.

From the above, movement about the pitch axis 22 and the roll axis 18 are described.

Figure 6:
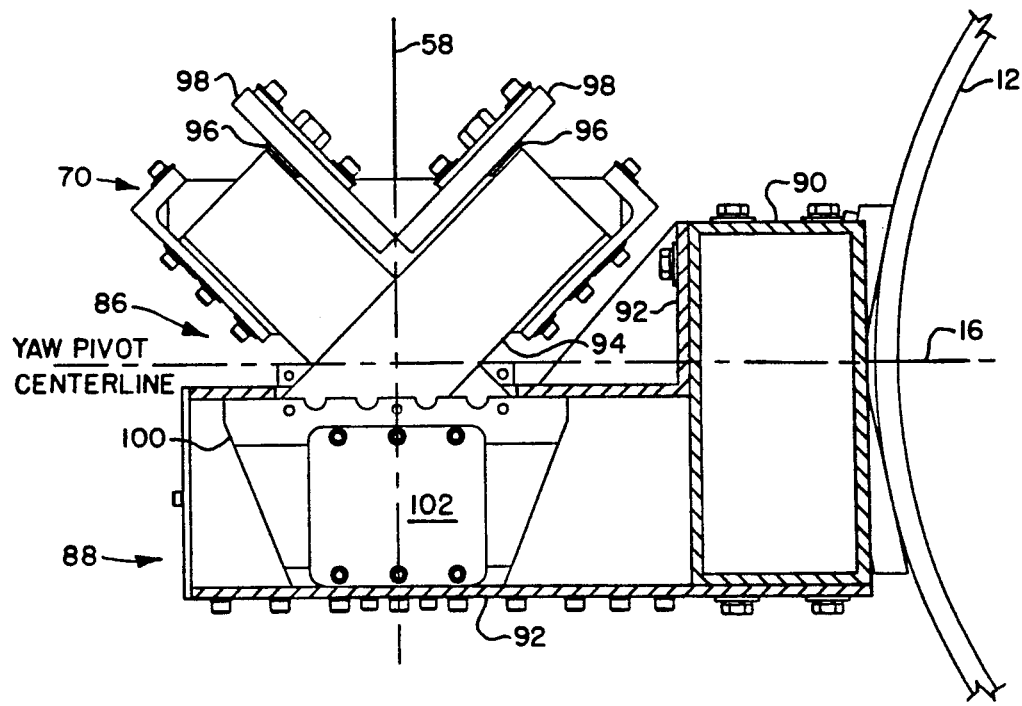
FIG. 6 is a cross section of FIG. 5 as indicated showing a yaw axis joint.

In order to provide for movement about the yaw axis 16, a yaw axis joint 86 is provided between the tensile universal joint 70 and a trunnion 88, FIG. 6.

As seen in FIG. 6, the payload 12 is attached to a payload side rail 90 that is bolted to an adjustable attachment 92, also being a housing, of the trunnion 88.

As seen in FIG. 6, a continuous yaw strap 94 is supported by the tensile universal joint 70. Each end of the yaw strap 94 is wrapped about a strap shaft 96. The shafts 96 are held in a yaw strap support 98 which is bolted into the joint 70. The lower section of the strap 94 is wrapped around a trunnion strap support 100 with a clamp 102.

The strap 94 criss crosses itself at a 90 degree angle and is positioned so that the lower roll axis 80 and the yaw axis 16 intersect at the center of the crossing straps. Two securing brackets 104 and 106 clamp (FIG. 5) about the crossing straps and an upper surface 108 thereon defines the plane in which the lower roll axis 80 and the yaw axis 16 must be, otherwise, the universal joint will not function properly. As the payload 12 rolls, for example, to the left in FIG. 6, the weight will shift to the most vertical strap. Thus preventing a lateral shear load on the supporting strap.

Figure 10:
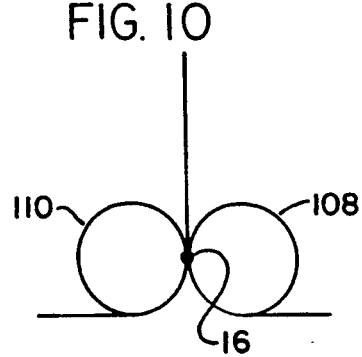
FIG. 10 is a partial side view showing the means for yaw roll when the strap is a homogeneous material.

As discussed previously, the yaw straps 94 can be replaced by a thin homogeneous material strap which is able to take both shear and tensile loads. Flexing a solid material strap requires that the strap flex over a larger radius. To minimize the shift in the yaw axis 16 of rotation, a single radius block is used on top of each trunnion and the radius block 108 wraps up on the strap while the other radius block 110 on the opposite trunnion unwraps down its strap during a yaw displacement, FIG. 10.

Clearly, many modifications and variations of the present invention are possible in light of the above teachings and it is therefore understood, that within the inventive scope of the inventive concept, the invention may be practiced otherwise than specifically claimed.

What is claimed is:

1. A test device, said test device being able to hold a payload thereon, the payload being able to move with three degrees of freedom about three orthogonal axes being along a gravity vector, said test device comprising:

a means for moving the payload about a pitch axis being along a gravity vector, said means including a high tensile strength, low cross sectional area line;

a means for moving the payload about a roll axis, said means for moving about a roll axis including a plurality of roll axis joints, said roll axis joints forming a parallelogram, said roll axis joints including high tensile strength straps, a means for moving the payload about a yaw axis, said means for moving about a yaw axis including a plurality of yaw axis joints, said yaw axis joints including high tensile strength straps; and a means for connecting the payload to said test device; said test device simulating a zero-gravity environment for the payload wherein said joints are substantially frictionless;

whereby each axis joint is capable of rotation by flexing a thin, high strength strap in bending, said strap providing a very low static friction and elastic stiffness, said joint elastic stiffness and apparent shift in center of rotation being essentially negated after the system is statically balanced over the range of angular excursions.

2. A test device as defined in claim 1 wherein said means for moving about a roll axis further includes:
a strong back assembly, said strong back assembly attached to said means for moving about a pitch axis, said strong back assembly having a center roll axis joint and two outer strong back roll axis joints; four lower roll axis joints;
a pair of tensile universal joints, said tensile universal joints, each of said tensile universal joints including two of said lower roll axis joints therein; and
a trunnion, said trunnion connected to said tensile universal joint and to a payload carrying frame.

3. A test device as defined in claim 2 wherein said center roll axis joint includes:
a strap, said strap attached to said means for moving about a pitch axis;
a center strap support, said strap having two ends, each end attached to a main support bracket;
a clamp plate, said clamp plate attached to said center strap support;
an adjustable strap pivot plate, said strap passing thereover; and
an inner attachment plate, said plate attached to said strap pivot plate with said strap therebetween.

4. A test device as defined in claim 3 wherein each of said outer roll axis joints comprises:
an outer strap support;
a strap clamp;
a strap, a middle portion of said strap wrapped about said outer strap support and being held thereon by said strap clamp; and
an outer attachment plate, said plate and said outer strap support fixedly attached to the ends of said strong back.

5. A test device as defined in claim 4 wherein each of said lower roll axis joints comprises:
a strap, a middle of said strap connected to said outer strong back roll axis joints on said strong back;
a pair of slant supports and dog bones therein, said supports having ends of said strap connected therein, said supports connected to said tensile universal joint; and
a slant support clamp, said slant support clamp attached to said slant supports having said strap pass therebetween, tops of said slant supports and said support clamps having a v channel therein defining a lower roll axis.

6. A test device as defined in claim 1 wherein said means for moving about a yaw axis further include:
a pair of tensile universal joints;
a pair of trunnions; and
a yaw axis joint, said yaw axis joint connected to said tensile universal joint and said trunnion, said trunnion connected to a payload carrying frame.

7. A test device as defined in claim 6 wherein said strap of said yaw axis joint is selected from the grouping consisting of fabric materials and homogeneous materials.

8. A test device as defined in claim 7 wherein said strap is a fabric material.

9. A test device as defined in claim 8 wherein said yaw axis joint comprises:
a strap;
a yaw frame, said yaw frame attached to said tensile universal joint, said yaw frame including two strap shafts being mounted 90° from each other, the ends of said strap being attached to each shaft, said strap criss-crossing itself;
a trunnion strap support;
a clamp plate; and
two securing brackets, a middle portion of said criss-crossing strap being wrapped around said trunnion strap support, said clamp plate attached to said trunnion strap support with said strap therebetween, said securing brackets attached to the top of said trunnion and having said criss crossing strap therebetween, the top of said security bracket defining a plane containing a yaw axis.

10. A test device as defined in claim 6 further including a guide block to be placed between said trunnion and said tensile universal joint to prevent movement therebetween when balancing the payload in roll and to support said tensile universal joints prior to suspension of the system.

11. A test device as defined in claim 6 wherein said trunnion includes:
a housing, said housing connected to a payload carrying frame and said housing connected to a yaw axis joint.

12. A test device as defined in claim 6 wherein said strap of said yaw axis joint is selected from the group consisting of fabric materials and homogeneous materials, further said homogeneous materials being selected from the group consisting of plastic and metal.

13. A test device as defined in claim 1 including a tensile universal joint, said tensile universal joint connected to said means for moving about a roll axis and said means for moving about a yaw axis, said tensile universal joint having two lower roll axis joints connected therein, said two lower roll axis joints having coincident roll axes, and one yaw axis joint connected thereon, said yaw axis joint having a yaw axis, said yaw axis and said roll axis being perpendicular to each and in a common plane, said tensile universal joint being a frame having said lower roll axis joint and said yaw joint attached therein.

* * * * *